United States Patent [19]
Burkes, Jr.

[11] 3,914,935
[45] Oct. 28, 1975

[54] DUAL AREA NOZZLE

[75] Inventor: William M. Burkes, Jr., McGregor, Tex.

[73] Assignee: Rockwell International Corporation, El Segundo, Calif.

[22] Filed: Mar. 1, 1971

[21] Appl. No.: 119,950

Related U.S. Application Data

[63] Continuation of Ser. No. 808,019, March 17, 1969, abandoned, which is a continuation-in-part of Ser. No. 448,557, April 6, 1965, abandoned.

[52] U.S. Cl. .................... 60/225; 60/242; 60/250; 60/263; 60/271
[51] Int. Cl. ............................................... F02k 9/06
[58] Field of Search ............. 60/250, 254, 271, 242, 60/225, 234, 253, 263; 239/265.19, 265.29, 265.33

[56] References Cited
UNITED STATES PATENTS

| | | | |
|---|---|---|---|
| 2,653,446 | 9/1953 | Price | 60/238 |
| 3,059,425 | 10/1962 | McSherry et al. | 60/253 |
| 3,110,153 | 11/1963 | House | 60/242 |
| 3,182,447 | 5/1965 | Bell, Jr. | 60/242 |
| 3,495,408 | 2/1970 | Frey | 60/250 |

*Primary Examiner*—Samuel Feinberg
*Attorney, Agent, or Firm*—L. Lee Humphries; Robert M. Sperry

[57] ABSTRACT

A boost-sustain solid rocket system having boost and sustain grains in the rocket casing with a fixed nozzle and a movable nozzle, which is operable in response to a pressure drop to a predetermined level in the combustion chamber resultant during burn-out of the boost grain, to block a portion of the throat areas of said nozzles and increase the combustion chamber pressure during burning of the sustain grain.

8 Claims, 7 Drawing Figures

INVENTOR.
WILLIAM M. BURKES, JR.

BY Thomas S. Macdonald

ATTORNEY

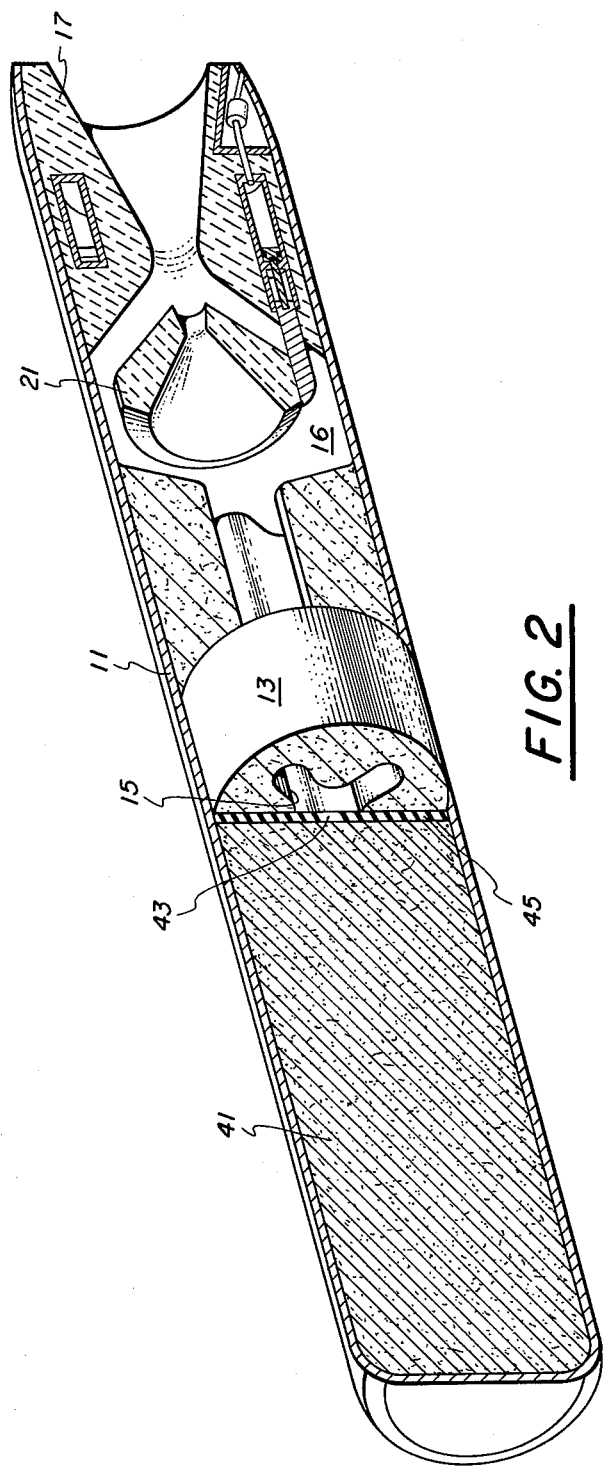

DUAL AREA NOZZLE

RELATED APPLICATION

This is a continuation of application Ser. No. 808,019 filed Mar. 17, 1969 which is a continuation -in- part of application Ser. No. 448,557 filed Apr. 6, 1965, both applications abandoned.

BACKGROUND OF THE INVENTION

Nearly all solid rockets could be improved in total performance if the thrust level required at any given instant could be provided exactly, without offsetting disadvantages in total impulse, cost, reliability, or weight. Four principle means have been studied in the past for providing either preprogrammed (fixed) thrust variations or guidance controlled (flexible) thrust variations within the motor; variation of motor chamber pressure, variation of motor mass flow, use of drag brakes to increase motor drag, variation of motor nozzle throat area.

Motor chamber pressure can be fitted to predetermined trace by providing the required grain geometry and by providing multiple casts of propellants having different burning rates. Any deviation from a simple end burner or internal burning grain, especially when combined with multiple casting within a motor, adds complexity to the system, increases motor cost substantially, and often drastically reduces the capability of the propellant grain to resist thermal cycling and vibration required for operational missiles. Variation of the motor mass flow would again require some sort of multiple casting of a number of propellant formulations, only one of which would probably be optimum for delivering maximum motor total impulse within the specified volume restraints.

Use of drag brakes for the portion of the trajectory at lower altitudes or of thrust spoilers at higher elevations again produces the specified net thrust but, again, at a loss of motor total impulse and with added mechanical complexity.

One apparent way in which the thrust can be varied and controlled in a liquid propellant engine and a thrust level maintained in a solid propellant engine is in the utilization of a variable area of throat. By increasing the throat area of the nozzle in an engine, the chamber pressure is decreased. The opposite effect occurs when the throat area is decreased. Thus, the configurations have been derived in the fields of liquid and solid propellant rockets wherein an internal plug is utilized in the divergent section of the nozzle. To increase or decrease the nozzle area, a mechanical system moves the internal plug into or out of the nozzle. The plug is normally shaped like a truncated cone with a rounded apex that is placed forward in the throat. The forward movement of the plug gives a reduction in cross-sectional areas of the throat in exit planes. One of the greatest problems with relation to the utilization of the center plug or pintle, as it is commonly called, is in the erosion due to the flow of hot gases. A small amount of erosion will significantly effect the overall geometry in that a relatively large change in the effective nozzle area is created.

SUMMARY OF THE INVENTION

The invention incorporates two discreet throat areas into one nozzle body. The above is accomplished by means of the formation of a conventional throat area in a nozzle. There is additionally present, a movable body which moves at the occurrence of a predetermined combustion chamber pressure drop to a sealing position with the main body wherein one flow area is presented. Two embodiments of the invention are presented. One embodiment, a normal nozzle throat configuration is initially preformed. A movable flow-restriction body is disposed just upstream of the throat area of the nozzle formed. The movable body has the second nozzle area formed concentrically within itself. Thus, in an open position the hot gases flow around the center body, through the main nozzle as well as through the center body and its secondary nozzle. In the closed position resultant from the combustion chamber having reached a predetermined pressure drop the movable body is flush against the walls leading to the throat area of the nozzle and the gases will only flow through the secondary exit. In the second embodiment of the invention, a center body is rigidly affixed adjacent the exit area of the engine. Just upstream of the center body is disposed a movable torus shaped element. The inner portion of the walls of the rocket engine and the outer circumference of the rigidly affixed center body form a first nozzle. A second nozzle is formed within the center body. The torus in its open position permits the exhaust gases to flow through the first nozzle as well as through the center of the second nozzle of the center body. When the torus is moved to the closed position, it serves to close the first nozzle permitting exhaust gases only to flow through the second nozzle of the center body. Thus it is seen, in both embodiments, the movable bodies affect the flow of gases through the first nozzle areas.

It is believed the invention will be described in better detail with relation to the following drawings in which:

FIG. 2 is a cross-sectional perspective view of a solid propellant rocket motor utilizing the embodiment of the invention of FIG. 1;

Figure 5:
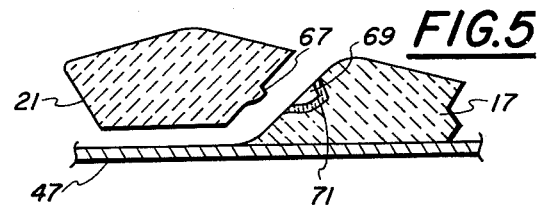
Figure 6:
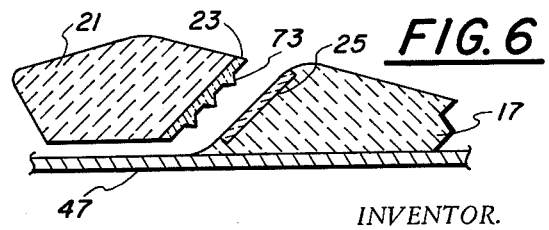
Figure 7:
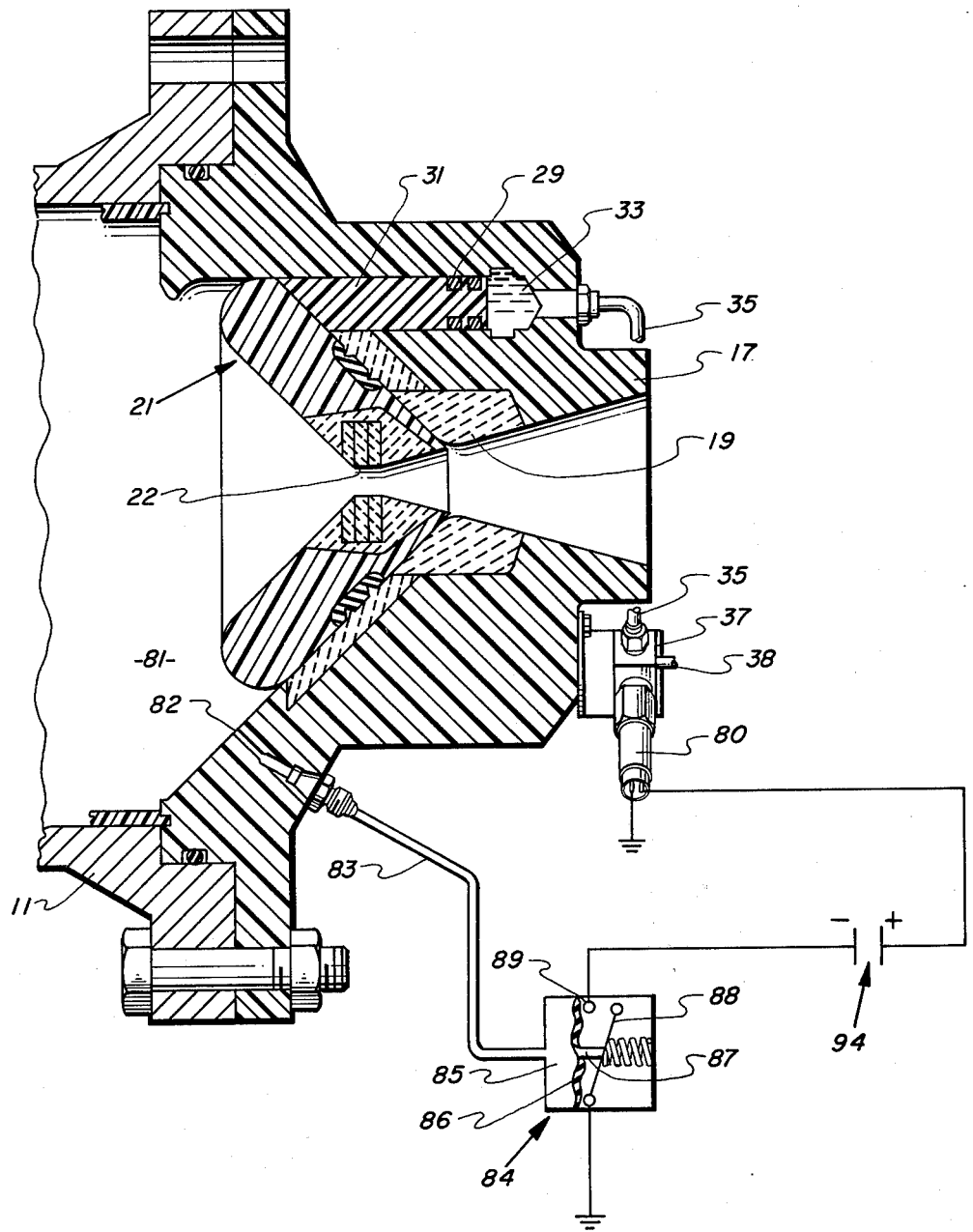

FIG. 5 discloses in detail one sealing arrangement between the movable body and the walls with which it engages;

FIG. 6 shows an alternative sealing arrangement for engagement of the movable bodies and the walls with which it engages;

FIG. 7 is a partial cross-sectional schematic of the nozzle actuating means.

Figure 1:
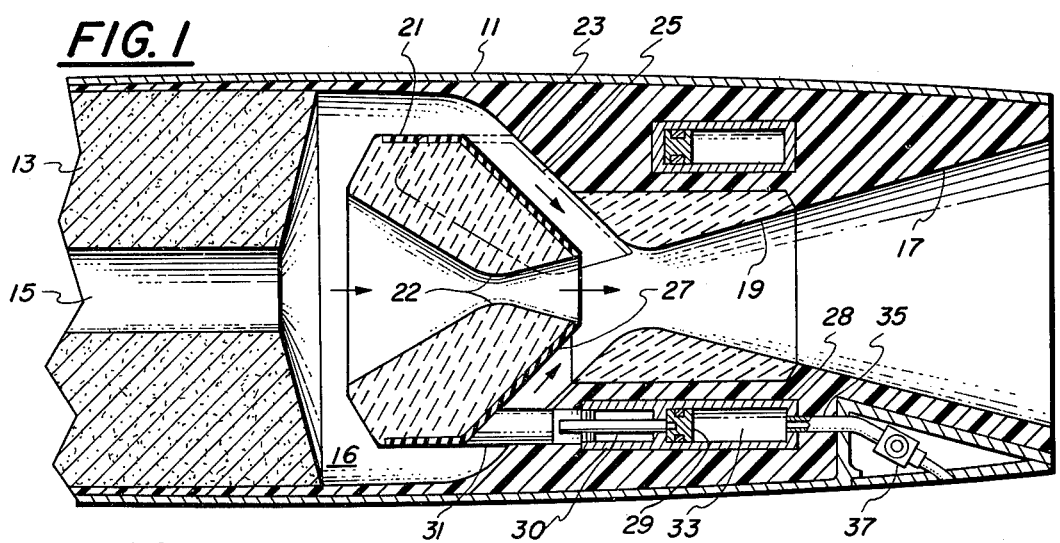
FIG. 1 is a cross-sectional view of the first embodiment of the invention.

Reference is now had to FIG. 1 disclosing one of the embodiments of the invention. Disclosed in FIG. 1 is the aft end of a solid propellant rocket motor having an outer casing or housing 11. Disposed within the outer casing is the solid propellant grain 13 which is depicted as having an internal perforation 15. Disclosed at the aft end of the casing downsteam of a combustion chamber area 16 is an exit section 17 having the configuration of a divergent nozzle. The exit nozzle section 17 can be made of materials such as asbestos or silica reinforced phenolic, and the like. An insert 19 which forms the throat of the nozzle 17 is normally of a refractory material such as graphite due to the extremely high temperatures and the highly erosive conditions in this region.

Disposed upstream from the first nozzle forming body 17 is a hollow nozzle forming movable body 21 having a throat section 22. The center line of the body 21 corresponds to that of the rocket motor and thus lies in the same axial alignment as the nozzle body 17. The body 21 is also formed of a refractory material which may be the same as that of the insert portion 19 or it can be of molded reinforced plastic or a combination thereof. Thus, the body 21 can be likened to a nozzle throat. As shown, this movable body 21 has the convergent-divergent nozzle disposed within it. The downstream outer wall 23 of the body 21 lies in a plane parallel to the forward surface 25 of the nozzle body 17. This outer wall 23 of the movable body 21 contains a surface 27 which will act as a seal against the forward surface 25 of the throat insert 19. Disposed within the nozzle body 17 is at least one, and preferably three or more, housings 28 which serve as cylinders for pistons 29. The piston 29 is rigidly affixed through a rod 30 to a support arm 31 which in turn is rigidly affixed to the movable body 21. Within the housing 28 is hydraulic fluid 33 which prevents normal movement of the piston and movable body 21 from its outward position as shown. Connected to the housing 28 is an outlet line 35 and an explosively actuated servo valve 37. Upon command from a source, (FIG. 7), resultant from a drop to a predetermined pressure level within the combustion chamber the servo valve 37 is opened releasing the fluid 33 from cylinder 28 through dump port 38. The force of the combustion gases will then move the body 21 toward a closed position.

The description of the operation disclosed in FIG. 1 is with reference to a two stage movement or operation of the center body 21. Initially, the center body is in an open position permitting the gas to flow through its nozzle section as well as around the center body and between it and the main nozzle portion 17 as shown by the arrows. The combined area of these two areas is greater than throat 19 of the nozzle portion 17 thus allowing the latter to govern chamber pressure. An alternate configuration for release of the pistons is the use of a retainer ring which is released by the use of a pyrotechnic exploding sector of the ring.

Reference is now had to FIG. 2 which depicts an entire rocket motor utilizing the dual area nozzle concept disclosed in FIG. 1. This particular drawing is utilized to explain one of the situations wherein the nozzle of the invention finds particular utility. The missile depicted in the drawing is for air-to-air application. It is comprised of two separate propellant grains, burning geometries or areas. The aft grain 13, as indicated in FIG. 1, has an internal configuration dictated by the shape of perforation 15. This is the grain that is initially ignited and has a burning rate governed by its formulation, area being burned, and the throat area 19. The forward grain 41 is completely solid and thus is termed an end burner providing burning from the aft end 43. As is readily apparent the second grain 41 burns similar to a cigarette and thus is often referred to as a cigarette burning grain. The surface area along which the burning transpires in this second grain is obviously much less than that of the first grain 13. As a result, the second grain 41 burns for a much longer duration. In the operation of the missile, both grains may be ignited simultaneously or the front grain may be isolated by an insulative material such as a rubber elastomer, or the like, 45 from the first grain 13. The insulative material 45 will burn away near burn-out conditions of the second grain 13, thus igniting the front grain. Or, a secondary igniter may be used on the front grain if a boost coast restart capability is desired. Therefore, whether the grains 13 and 41 are ignited simultaneously or separately the end effect is that the missile has what is called the boost-sustain performance. The first grain 13 gives initial rapid acceleration to the missile. The secondary grain 41 then takes over and gives the missile a long duration sustained operation. Due to the fact that the first grain 13 is a rapid burning one and(or) has a large burning area, which in turn generates high chamber pressures (the burning rate of solid propellants is also sensitive to chamber pressure under which they are operating), the outer case 11 must be of a relatively heavy construction as compared to a grain that would generate lesser chamber pressures; such as grain 41. Thus, when grain 13 is burning, the initial area exits are presented to the exhaust gases and a certain chamber pressure is maintained. When the grain 13 is burned out and grain 41 is then burning, the chamber pressure will drop considerably since grain 41 can be a slower burning propellant and(or) the smaller burning area. The lower chamber pressure also reduces the burning rate. This result would occur provided there is no change in the effective throat area of the nozzles. It would appear, thus, that there would be a relatively heavy case designed for higher chamber pressure than is required for propellant 41 when this propellant alone is burning. Thus, to maximize the utilization of the heavy case to sustain high pressure the movable body 21 is displaced upon the occurrence of a drop to a predetermined lower chamber pressure to a closed position against the main nozzle body 17 as indicated in FIG. 1 presenting one exit for the gases which results in a considerably smaller effective throat area. By closing the dual area exhaust and lessening the throat area, the chamber pressure is again increased to a level approximating that prior to the burn-out of grain 13. This will then give maximum efficiency to the burning of grain 41 so that the benefit from the heavy case 11 will be obtained. The smaller throat 22 results in a greater expansion ratio for that portion of the rocket operation as well as affording the higher chamber pressure and added combustion efficiency for the propellant.

FIG. 2 represents merely one situation in which the constituted invention can be utilized. The feature of the invention can be used to vary delivered thrust with increased efficiency in conjunction with either constant or varied mass flow rates. In solid propellants various effects are possible by using the dual area main design with or without different burning rate propellants or a single area of surface grain with or without a variety of burning rates for a combination of the previous two possibilities with or without propellant selection with a high pressure exponent. It is possible to obtain a selective order or combination of boost-sustainer and sustainer-boost levels depending upon solid propellant grain areas, geometries, burning rates, and pressure exponents. It is also possible to obtain more combinations than previously available; for example, boost-sustainer-boost, sustainer-boost-sustainer, $boost_1$-sustainer-$boost_2$, boost-$sustainer_1$-$sustainer_2$ and the like by propellant grain design selection and specifically formulated propellant burning rates and pressure exponents in combination with either an opening, re-opening, or causing less restriction of a flow channel by actuating or releasing the movable center body in response to changing pressure relationships (either increases or drops) in the combustion chamber. Various state-of-the-art pressure change responsive valves may be employed to effectuate the desired body movements.

Figure 3:
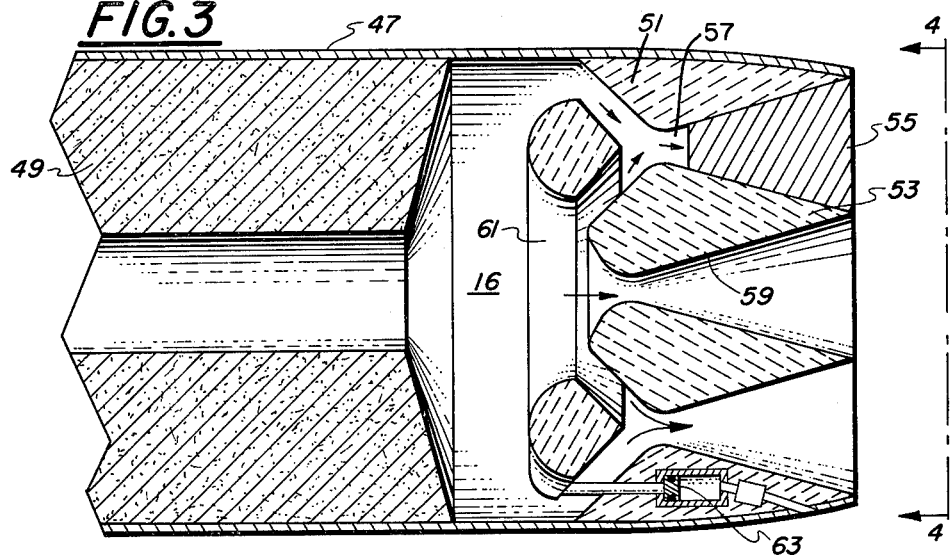
FIG. 3 is a cross-sectional view of the second embodiment of the invention.
Figure 4:
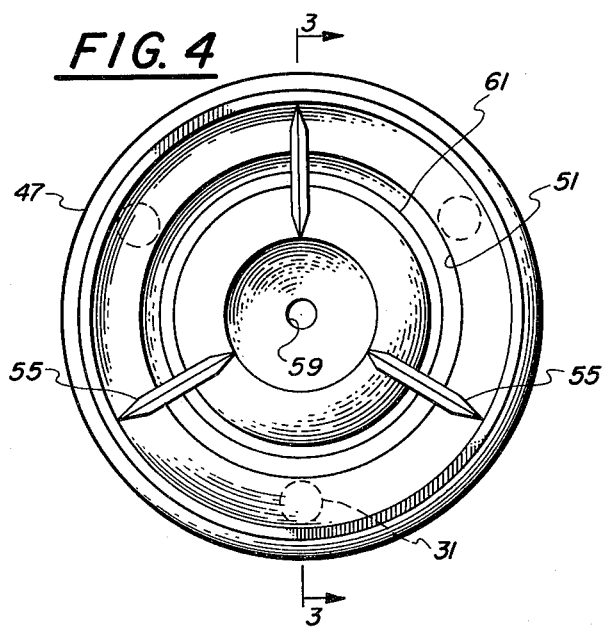
FIG. 4 is a cross-sectional view taken along lines 4—4 of FIG. 3.

Referring now to FIG. 3, there is disclosed a second embodiment of the invention. A solid propellant grain 49 is disposed within a casing or housing 47. At the aft end of the housing and internally disposed therein is a circumferentially formed portion 51 in the configuration of a convergent-divergent nozzle. An internal body 53 is shaped about its outer periphery so as to form with the portion 51, a first annular convergent-divergent nozzle 57. The body 53 is not movable but rather is permanently supported by struts 55. The positioning of the struts in relation to the center body 53 is particularly well shown in the cross-sectional view of FIG. 4. The center body 53 has a second convergent-divergent nozzle 59 formed concentrically therein. Just upstream of the annular nozzle 57 is disposed a torus-shaped movable body 61. In the open position shown, the gases from grain 49 flow, as shown by arrows, around the torus and through the throat portion of the first nozzle 57 as well as flowing through the second nozzle 59. Actuating means 63 is essentially the same as that of FIG. 1.

FIGS. 5 and 6 disclose two means for sealing the face of the movable bodies of FIGS. 1 and 3, to the stationary nozzle portion when the movable bodies are moved to a closed position. It should be apparent that it is quite desirable that a tight seal be had in the closed position so that no gas leaks through the secondary path. Fig. 5 shows a relatively simple tongue and groove configuration. The center body 21 has a tongue portion 67 of refractory metal or molded plastic material which meets with a groove 69 disposed on the main nozzle body 17. The groove 69 may be lined with a sealing material 71 which could be, for example, of a rubber asbestos mixture or a silicone rubber composition. Since the groove is located on the upstream side of the throat of the nozzle and is in a lesser gas velocity region and it is not as hot as in the throat or aft portion of the nozzle. As a result, the resilient material 71 will be slightly melted or eroded so that a good seal will transpire between it and the tongue portion 67. It should be apparent that the tongue and groove circumferentially surround the movable body and stationary portion. FIG. 6 represents another sealing arrangement wherein a plate 23 of refractory material having annular protrusions 73 thereon is disposed about the surface of the movable body 21, adjacent the stationary portion 17 of the nozzle. The nozzle has a corresponding plate 25 also of a refractory metal. As the hot gases pass by the surfaces of the refractory metal a slight melting thereof occurs so that the protrusions 73 will seat within the matching surface 25 of the stationary portion making a good seal. Three protrusions are shown only by way of example, it should be apparent that more or less protrusions as needed can be utilized.

FIG. 7 describes in detail one form of nozzle actuating means. Number designations corresponding to those shown in FIG. 1 are generally used. The nozzle 21 and throat 22, preferably graphite, are shown in the sustain position wherein gases flow through throat 22 and are not affected by the boost throat formed by insert 19. In the preferred embodiment support arms 31, normally three in number equidistantly spaced around the body periphery are directly connected between body 21 and piston 29. Piston 29 includes a piston face facing a source of hydraulic fluid 33 contained within one end of housing 28. Outlet or dump line 35 extends from the cavity containing the hydraulic fluid. An explosively-actuated servo valve 37 is contained in line 35 which allows flow of the fluid from the cavity and resultant movement of piston 29, arm 31 and body 21 rearwardly into sealing position with the main fixed nozzle containing throat insert 19. Servo valve 37 is moved into the hydraulic fluid dump position by actuation of an explosive acutator 80 such as shown in U.S. Pat. No. 2,815,882.

Actuation of actuator 80 is triggered by the sensing of pressure drop in combustion chamber 81 to a predetermined level during burnout of the boost grain. The pressure is communicated from a chamber port 82 by line 83 to pressure responsive transducer 84. Tranducer 84 typically comprises a balance diaphragm 86, a contact actuator rod 87 and a spring pressed electrical contact arm 88 which is adapted, upon the lessening of a predetermined pressure in volume 85 and movement of diaphragm 86 to the left, to make contact with contact 89 completing an electrical circuit between ground 90 and a battery source 91 of direct current voltage which triggers explosive actuator 80, subsequent opening of servo dump valve 37 and release of hydraulic fluid through line 38 allowing the internal combustion chamber pressure to slide the body 21 and its pistons into a rearward or aft position to block the additional throat portion. With only the small throat 22 formed by body 21 effective, the pressure in the chamber 81 is built up by the sustain grain so that it burns and performs at the desired optimum conditions and efficiency.

Though the description of the invention has been with regard to a separate body forming a nozzle about the inner periphery of the outer housing, instead of a separate body such as 17 of FIG. 1 and 51 of FIG. 3, the outer housing may be initially formed to the desired nozzle configurations. The elements to activate the movable bodies would then be on the outside of the housing.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A solid rocket system comprising a rocket casing, solid propellant boost and sustain grains in said casing, a combustion chamber and a rocket nozzle, said rocket nozzle being connected to the exit end of said combustion chamber and comprising a first convergent-divergent nozzle portion having a minimum throat area, a second convergent-divergent nozzle portion having an additional throat area, a solid annular plug means spaced from the interior periphery of said combustion chamber in juxtaposition to said second convergent-divergent nozzle portion in a first position so as to effectively allow flow of exhaust gases through both of said nozzle portions during boost phase operation, and means including at least one axially extending translatable rod fixed to said plug means to move said plug means translationally into a second fixed position blocking all of the additional throat area of said second convergent-divergent nozzle portion during a sustain phase operation so as to decrease the total effective throat area of the overall nozzle and to allow flow of exiting gases through only said first nozzle portion, said means to move said plug means being in direct communication to said combustion chamber during all phases of operation and being operable only in response to a pressure drop to a lower predetermined pressure level in said combustion chamber during burnout of one of said grains.

2. The invention as set forth in claim 1 in which said first nozzle portion comprises means forming a central convergent-divergent aperture in said annular plug means and said means to move said plug means is responsive to a pressure drop to a predetermined level in said combustion chamber during burnout of said boost grain.

3. The invention as set forth in claim 1 in which said first nozzle portion is centrally contained in said plug means and said plug means translatable rod has at least one fixed piston portion extending rearwardly therefrom into a reservoir formed within a surrounding support for said second nozzle portion, a pressure sensing port in said combustion chamber cooperating with said rod and said reservoir, to actuate said plug means into blocking position when the pressure in said combustion chamber drops to said predetermined level.

4. The invention as set forth in claim 3 in which said reservoir contains a hydraulic fluid and said pressure port is in flow communication with a diaphragm-operated valve for releasing hydraulic fluid from said reservoir to permit movement of said rod and said plug means into said blocking position.

5. A nozzle for disposition at the downstream exit end of a thrust-producing device comprising:
   an outer housing for receiving the combustion gases of said device,
   an inner annular wall portion peripherally formed on said housing, said wall portion forming a convergent-divergent passage for exhaust gases, wherein the point of greatest convergence forms a first throat area,
   a rigidly affixed hollow body disposed in said first throat area, said body containing a second throat area formed concentrically therein,
   means for selectively controlling at least a portion of the exhaust gas flowing though said first throat area.

6. The nozzle of claim 5 wherein said means for selectively controlling at least a portion of the gas through said first throat area comprises an axially movable annular ring disposed upstream from said wall portion, said ring provided with a downstream portion of seating against the upstream surfaces of both said wall portion and said body in the closed position.

7. The nozzle of claim 6 further comprising means for moving said annular ring.

8. The nozzle of claim 6 further comprising means on the mating surfaces of said ring, said wall portion and said body for effecting a seal therebetween when said ring is in a closed position.

* * * * *